United States Patent [19]

König et al.

[11] 4,089,835
[45] May 16, 1978

[54] STABLE POLYURETHANE DISPERSIONS AND PROCESS FOR PRODUCTION THEREOF

[75] Inventors: Klaus König; Manfred Dietrich, both of Leverkusen, Germany

[73] Assignee: Bayer Aktiengesellschaft, Leverkusen, Germany

[21] Appl. No.: 691,174

[22] Filed: May 28, 1976

Related U.S. Application Data

[63] Continuation-in-part of Ser. No. 578,050, May 15, 1975, abandoned.

[30] Foreign Application Priority Data

| Mar. 27, 1975 | Germany | 2513815 |
| Nov. 12, 1975 | Germany | 2550833 |
| Nov. 12, 1975 | Germany | 2550862 |

[51] Int. Cl.$^2$ .......... C08K 5/11; C08G 18/12; C08G 18/32

[52] U.S. Cl. .......... 260/31.6; 252/308; 260/31.8 R; 260/32.6 N; 260/33.2 R; 260/2.5 BE; 260/2.5 BD; 260/2.5 BC; 260/75 NE; 260/77.5 AA; 260/858

[58] Field of Search .......... 260/77.5 AA, 75 NE, 260/2.5 AM, 31.6 R, 32.6 N, 33.2 R, 858, 2.5 BE; 252/308

[56] References Cited

U.S. PATENT DOCUMENTS

| T777,420 | 7/1969 | McSpadden et al. | 260/77.5 AA |
| T777,421 | 7/1969 | Spangler et al. | 260/77.5 AA |
| 3,141,865 | 7/1964 | McEvoy | 260/77.5 AA |
| 3,325,421 | 6/1967 | Mueller | 252/308 |
| 3,440,086 | 4/1969 | Kerns | 260/77.5 AA |
| 3,894,994 | 7/1975 | Day et al. | 260/77.5 AA |
| 3,939,222 | 2/1976 | Dieterich | 260/858 |
| 3,963,679 | 6/1976 | Ulrich et al. | 260/75 NE |

OTHER PUBLICATIONS

DAS 1,260,142, Bayer A/G, Feb. 1968.

*Primary Examiner*—H.S. Cockeram
*Attorney, Agent, or Firm*—Gene Harsh; Joseph C. Gil; R. Brent Olson

[57] ABSTRACT

The instant invention is directed to stable dispersions and the process of their manufacture. The stable dispersions of the instant invention comprise polyureas and/or polyhydrazo-dicarbonamides as the disperse phase in an hydroxyl group containing material selected from the group consisting of polyethers, polyesters, polyester amides, polycarbonates, and mixtures thereof, and are produced by reacting (1) organic polyisocyanates with (2) polyamines containing primary and/or secondary amino groups and/or hydrazines and/or hydrazides in (3) the hydroxyl group containing material. Component (3) may also contain relatively low molecular weight polyols and/or inert organic solvents. Components (1), (2) and (3) are continuously introduced into a flow mixer in such a quantity that the average residence time in the mixer is less than ten minutes.

22 Claims, No Drawings

STABLE POLYURETHANE DISPERSIONS AND PROCESS FOR PRODUCTION THEREOF

CROSS REFERENCE TO RELATED APPLICATION

This application is a continuation-in-part of copending U.S. application Ser. No. 578,050, filed May 15, 1975, and now abandoned.

BACKGROUND OF THE INVENTION

Stable dispersions of polyaddition products of diisocyanates and bifunctional primary or secondary amines, hydrazines or hydrazides in polypropylene glycol ethers are generally known. Dispersions of this type may be prepared by initially introducing the amine component in solution in the polyether and adding the diisocyanate dropwise at room temperature (see, e.g. German Auslegeschrift No. 1,260,142). However, even very small quantities of the polyaddition product (from 2 to 5%) are sufficient to produce a considerable increase in viscosity.

Polyurethane foams with improved mechanical properties (more especially increased tensile strength and hardness) may be produced from dispersions of the type in question by reaction with polyisocyanates. However, dispersions with a resinous solids content of approximately 10% by weight have to be used in order to obtain distinct improvements in the property spectrum which comply with the requirements of the motor vehicle and upholstery industries. Unfortunately, dispersions with a solids content as high as this, produced by the process described in German Auslegeschrift No. 1,260,142 (U.S. Pat. No. 3,325,421), may only be commercially processed into polyurethane foams in low-pressure machines on account of their high viscosity. However, most foam manufacturers use high-pressure machines in which the starting materials must have viscosities of less than 2500 cP at 25° C. The dispersions produced in accordance with German Auslegeschrift No. 1,260,142 are not suitable for foaming in high-pressure machines because of their high viscosities. Thus, for example, the reaction of tolylene diisocyanate with hydrazine in a standard commercial-grade soft foam polyether to form a 10% dispersion in accordance with German Auslegeschrift No. 1,260,142 gives a product with a viscosity of more than 10,000 cP/25° C.

Accordingly, an object of the present invention is to provide non-sedimenting dispersions of polyureas and polyhydrazo-dicarbonamides or corresponding mixed polyaddition products in hydroxyl group-containing organic materials with viscosities of less than 2500 cP/25° C at a resinous solids content of approximately 10% by weight.

DESCRIPTION OF THE INVENTION

It has now surprisingly been found that dispersions of this type with the low viscosities required may be obtained by carrying out the polyaddition reaction in the presence of the hydroxyl-group containing organic material in a continuous high-performance flow mixer.

Accordingly, the present invention relates to a process for the in situ production of stable dispersions of polyureas and/or polyhydrazo-dicarbonamides in an hydroxyl group-containing organic material selected from the group consisting of polyethers, polyesters, polyester amides, polycarbonates and mixtures thereof, by reacting:

(1) organic polyisocyanates, with
(2) polyamines containing primary and/or secondary amino groups and/or hydrazines and/or hydrazides, in
(3) said hydroxyl-group-containing organic material;

wherein components (1), (2) and (3) are continuously introduced into a flow mixer in such a quantity that the average residence time in the mixer is less than 10 minutes, the equivalent ratio between components (1) and (2) being from 0.8:1 to 1.05:1, and the reaction product issuing from the flow mixer is subsequently collected in a receiver. The three components may be separately introduced into the flow mixer. Alternatively, component (1) may be introduced separately from a mixture of components (2) and (3). If desired, the receiver may be heated. When so heated, the temperature is preferably maintained between 50° and 150° C. Additionally, if desired, the product may be stirred while in the receiver to complete the reaction if necessary. Additionally component (3) may contain relatively low molecular weight polyols and/or inert organic solvents.

The instant invention also relates to stable dispersions produced according to the above-outlined process.

In one particular embodiment of the process according to the invention, monoisocyanates and/or primary or secondary monoamines and/or monohydrazides may also be used in certain proportions in order to achieve selected molecular weights. Alkanolamines may also be added during the polyaddition reaction for this purpose. In this way, reactive groups are additionally introduced into the polyurea or polyhydrazodicarbonamide particles.

In addition, it is often desirable to use certain proportions of emulsifying substances which stabilize the dispersion, such as mono- or bi-functional polyethers containing amino, semicarbazide or isocyanate groups.

Dispersions containing from 1 to 35% by weight of polyureas and/or polyhydrazodicarbonamides (i.e., resinous solids content) are preferred. Dispersions with a viscosity of less than 2500 cP/25° C for a solids content of approximately 10% by weight are particularly preferred.

Although, in the reaction of polyisocyanates with polyamines in the presence of the hydroxyl group-containing material, the NCO-groups react preferentially with the NH$_2$-groups, the OH-groups also play their part in the reaction. This reaction results in the formation of polyurea and/or polyhydrazo dicarbonamide chains which are chemically attached to molecules of the hydroxyl containing material. Molecules of this type presumably have a dispersing effect upon the resinous particles. The extent to which the OH-groups take part in the polyaddition reaction is governed by the course of the reaction. If too many hydroxyl functional molecules react with the polyisocyanates, highly viscous dispersions are obtained. This is obviously the case with the procedure described in German Auslegeschrift No. 1,260,142. If, on the other hand, the proportion of co-reacting hydroxyl functional molecules is too small, the dispersions formed are in danger of being unstable. By following the process of the instant invention, it is surprisingly possible to control the NCO/OH-reaction to such a degree that finely divided dispersions with the low viscosity required are formed. Additionally, the dispersions are still so stable that they do not sediment even after prolonged storage and even after storage at elevated temperatures.

In cases where low-viscosity hydroxyl functional materials containing only secondary OH-groups or where substantially non-reactive (aliphatic) isocyanates are used, the proportion of co-reacting hydroxyl-functional molecules may be too small to form a stable dispersion. In this case, it is best to include in the polyaddition reaction, substances which have an emulsifying effect and, hence, increase the stability of the dispersion. Substances of this type are linear polyethers having an average molecular weight of from 300 to 4000 which contain NCO-groups or amino or hydrazide groups at one or both ends of the chain. It is preferred to use polyethers of the type which contain one of the above-mentioned reactive groups at only one end of the chain. Thus, the dispersions of the instant invention (preferably those having a solids content of from 10 to 20% by weight) are generally added to the dispersion stabilizing polyethers of up to 5% by weight and preferably in a quantity of up to 3% by weight, (based on the total quantity of polyether and resinous solids). In the case of dispersions with a higher or lower solids content, the dispersion aid is used in a correspondingly larger or smaller quantity.

Modified polyethers with a dispersing effect which may optionally be used in accordance with the invention include the addition products of excess diisocyanates and/or polyisocyanates of the type mentioned below with monofunctional and/or bifunctional hydroxyl polyethers having average molecular weights of from 300 to 4000 which may optionally have been freed from unreacted free isocyanate by thin-layer distillation. However, isocyanate prepolymers of this type may also be reacted with the excess free isocyanate to form allophanate isocyanates. It is also possible to convert the addition products containing terminal isocyanate groups by reaction with excess diamines or hydrazine into polyethers containing terminal amino or semicarbazide groups such as described in German Auslegeschrift Nos. 1,122,254 and 1,138,200.

Polyethers containing terminal amino groups, of the type which may be obtained by the processes described in U.S. Pat. No. 3,155,278 or in German Auslegeschrift No. 1,215,373, may also be used as dispersants in accordance with the invention.

Finally, hydroxyl polyethers may also be converted by reaction with phosgene into the chloroformic acid esters which may be subsequently reacted with excess diamine or hydrazine. As mentioned above, it is preferred to use polyethers of the type which contain an NCO- or $NH_2$-group at only one end of the chain.

The particle size of the dispersed polyaddition products is also of critical significance to the improvements in properties which the final products herein bring about in the polyurethane plastics produced from them. For example, in cases where polyether dispersions are used as starting materials for the production of polyurethane foams, the diameter of the filler particles must be considerably below the cell web dimensions (from 20 to 50 $\mu$). In polyurethane coatings, the particles also have to be so small that uniform coatings with a smooth surface are obtained, even with very thin applications. Dispersions of particle size less than 1 $\mu$ comply ideally with practical requirements and are advantageously and easily formed by the process according to the instant invention.

The hydroxyl-group containing materials useful in the instant invention are selected from the group consisting of polyethers, polyesters, polyester amides, polycarbonates, and mixtures thereof.

The polyethers useful in the instant invention preferably contain from 1 to 8 and more preferably from 2 to 6 primary and/or secondary hydroxyl groups. The polyethers preferably have molecular weights of from 200 to 16,000 and more preferably from 500 to 12,000. Polyethers of this type may be obtained in known manner by reacting starter compounds containing reactive hydrogen atoms with alkylene oxides, such as ethylene oxide, propylene oxide, butylene oxide, styrene oxide, tetrahydrofuran or epichlorohydrin, or with mixtures of these alkylene oxides. In many cases, it is preferred to use polyethers of the type which contain predominant amounts of primary OH-groups.

Suitable starter compounds containing reactive hydrogen atoms include water, methanol, ethanol, ethylene glycol, 1,2- or 1,3-propylene glycol, 1,4- or 2,3-butylene glycol, 1,6-hexane diol, 1,8-octane diol, neopentyl glycol, 1,4-bis-hydroxymethyl cyclohexane, 2-methyl-1,3-propane diol, glycerol, trimethylolpropane, 1,2,6-hexane triol, 1,2,4-butane triol, trimethylolethane, pentaerythritol, mannitol, sorbitol, methylglycoside, cane sugar, phenol, isononylphenol, resorcinol, hydroquinone, 1,2,2- and 1,1,3-tris-(hydroxyphenyl)-ethane, ammonia, methylamine, ethylene diamine, tetra- or hexa-methylene diamine, diethylene triamine, ethanolamine, diethanolamine, triethanolamine, aniline, phenylene diamine, 2,4- and 2,6-diaminotoluene and polyphenyl-polymethylene-polyamines of the type obtained by condensing aniline with formaldehyde. In addition, resin-like materials of the phenol and resol type may also be used as starters. Polyethers modified with vinyl polymers, e.g. the compounds obtained by polymerizing styrene and acrylonitrile in the presence of polyethers (U.S. Pat. Nos. 3,383,151, 3,304,273, 3,523,093 and 3,110,695 and German Patent Specification No. 1,152,536) and polybutadienes which contain OH groups are also suitable.

The polyesters containing hydroxyl groups which generally have molecular weights of from 400 to 16,000 and preferably from 500 to 12,000, suitable for use in the instant invention include reaction products of polyhydric (preferably dihydric and, optionally, trihydric) alcohols with polybasic (preferably dibasic) carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may be substituted (for example by halogen atoms) and/or unsaturated. Examples of suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester and terephthalic acid-bis-glycol ester. Examples of suitable polyhydric alcohols include ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, glycerol, trimethylol propane, 1,2,6-hexane triol, 1,2,4-butane triol, trimethylol ethane, triethylene glycol, tetraethylene glycol, polyethylene glycols, dipropylene glycol, polypropylene glycols, dibutylene glycol and polybutylene glycols. The polyesters may also contain terminal carboxyl groups. Polyesters of lactones, such as ε-caprolactam, or hydroxy carboxylic acids, such as ω-hydroxy caproic acid, may also be used.

Suitable polycarbonates containing hydroxyl groups are those known compounds which may be obtained, for example, by reacting diols, such as 1,3-propane diol, 1,4-butane diol and/or 1,6-hexane diol, diethylene glycol, triethylene glycol or tetraethylene glycol, with diaryl carbonates, such as, diphenyl carbonate, or phosgene.

The polyester amides include, for example, the predominantly linear condensates obtained from polybasic saturated and unsaturated carboxylic acids or their anhydrides and polyhydric saturated and unsaturated amino alcohols, diamines polyamines and mixtures thereof.

The molecular weight ranges for both the polycarbonates and polyester amides and generally from 400 to 16,000, and preferably from 500 to 12,000.

Suitable polyamines useful in the instant invention include: divalent and/or higher polyvalent, primary and/or secondary, aliphatic, araliphatic, cycloaliphatic or aromatic amines. Specific examples include ethylene diamine, 1,2- and 1,3-propylene diamine, tetramethylene diamine, hexamethylene diamine, dodecamethylene diamine, trimethyl diaminohexane, N,N'-dimethyl ethylene diamine, 2,2'-bis-aminopropyl methylamine, higher homologues of ethyl diamine, such as diethylene triamine, triethylene tetramine and tetraethylene pentamine, homologues of propylene diamine, such as dipropylene triamine, piperazine, N,N'-bis-aminoethyl-piperazine, triazine, 4-aminobenzylamine, 4-aminophenylethylamine, 1-amino-3,3,5-trimethyl-5-aminomethyl cyclohexane, 4,4'-diaminodicyclohexylmethane and propane, 1,4-diaminocyclohexane, phenylene diamines, naphthylene diamines, condensates of aniline and formaldehyde, tolylene diamines, bis-aminomethyl benzenes and the derivatives of the above-mentioned aromatic amines monoalkylated on one or both nitrogen atoms. The polyamines useable will generally have molecular weights of from about 60 to about 10,000, and preferably from 60 to 3000 with the molecular weight range of from 60 to 1000 being particularly preferred.

Suitable hydrazines include hydrazine itself and mono- or N,N'-disubstituted hydrazines, the substituents being, e.g. $C_1$–$C_6$-alkyl groups, cyclohexyl groups or phenyl groups. The hydrazines generally have a molecular weight of from 32 to 500. It is generally preferred to use hydrazine itself.

Suitable hydrazines and hydrazides useful in accordance with the instant invention include hydrazine, methyl hydrazine, ethyl hydrazine, hydrazine hydrate, propyl hydrazine, isopropyl hydrazine, n-butyl hydrazine, isobutyl hydrazine, tert.-butyl hydrazine, butenyl hydrazine, dodecyl hydrazine, phenyl hydrazine, tolyl hydrazine, chlorophenyl hydrazine, nitrophenyl hydrazine, benzyl hydrazine, 2-phenylethyl hydrazine, cyclohexyl hydrazine, cyclopentyl hydrazine, β-cyanoethyl hydrazine, 1,2-dimethyl hydrazine, 1,2-diethyl hydrazine, 1,2-diisobutyl hydrazine, 1-butyl-2-methyl hydrazine, hydrazobenzene, 1-benzyl-2-phenyl hydrazine, oxallyl dihydrazide, semicarbazide, carbohydrazide, 4-methyl semicarbazide, 4-phenyl semicarbazide, isophthalic acid dihydrazide, β-hydrazinopropionic acid hydrazide, thiosemicarbazide, thiocarbohydrazide, aminoguanidine, 1-amino-piperazine and 1,4-diaminopiperazine.

The hydrazides useable are generally the hydrazides of divalent or higher polyvalent carboxylic acids, such as carbonic acid, oxalic acid, malonic acid, succinic acid, adipic acid, sebacic acid, azelaic acid, maleic acid, fumaric acid, phthalic acid, isophthalic acid, and terephthalic acid; the esters of hydrazinomonocarboxylic acid with dihydric or higher polyhydric alcohols and phenols, such as ethane diol, 1,2-propane diol, 1,2-butane diol, 1,3-butane diol and 1,4-butane diol, hexane diol, diethylene glycol, triethylene glycol, tetraethylene glycol, dipropylene glycol, tripropylene glycol and hydroquinone; and the amides of hydrazinomonocarboxylic acid (semicarbazides) with, for example, the above-mentioned diamines and polyamines. The hydrazides generally have molecular weights of from 90 to 10,000, preferably from 90 to 3000 and, with particular preference, from 90 to 1000.

The above-mentioned amines and hydrazines are optionally used in the form of their standard commercial-grade aqueous solutions.

Isocyanates suitable for use in accordance with the invention include aliphatic, cycloaliphatic, araliphatic, aromatic and heterocyclic polyisocyanates of the type described, for example, by W. Siefken in Justus Liebigs Annalen der Chemie, 562, pages 75 to 136. Specific examples include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate, and mixtures of these isomers; 1-isocyanate-3,3,5-trimethyl-5-isocyanato methyl cyclohexane (see, e.g. German Auslegeschrift No. 1,202,785 and U.S. Pat. No. 3,401,190); 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or 4,4'-diisocyanate; naphthylene-1,5-diisocyanate; triphenyl methane-4,4',4''-triisocyanate; polyphenyl polymethylene polyisocyanates of the type which may be obtained by condensing aniline with formaldehyde, followed by phosgenation, and which are described, for example, in British Pat. Nos. 878,430 and 848,671; m- and p-isocyanatophenyl sulphonyl isocyanates of the type described in U.S. Pat. No. 3,454,606; perchlorinated aryl polyisocyanates of the type described, for example, in U.S. Pat. No. 3,277,138; polyisocyanates containing carbodiimide groups of the type described in U.S. Pat. No. 3,152,162; diisocyanates of the type described in U.S. Pat. No. 3,492,330; polyisocyanates containing allophanate groups of the type described, for example, in British Pat. No. 994,890, Belgian Pat. No. 761,626 and published Dutch Patent Application No. 7,102,524, polyisocyanates containing isocyanurate groups of the type described, for example, in U.S. Pat. No. 3,001,973, in German Pat. Nos. 1,022,789; 1,222,067 and 1,027,394, and in German Offenlegungsschriften Nos. 1,929,034 and 2,004,048; polyisocyanates containing urethane groups of the type described, for example, in Belgian Pat. Nos. 752,261 or in U.S. Pat. No. 3,394,164; polyisocyanates containing acylated urea groups of the type described in German Pat. No. 1,230,778; polyisocyanates containing biuret groups of the type described, for example, in German Pat. No. 1,101,394, U.S. Pat. Nos. 3,124,605 and 3,201,372 and in British Pat. No. 889,050; polyisocyanates obtained by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned isocyanates with acetals as described in German Pat. No. 1,072,385; and polyisocyanates containing polymeric fatty acid radicals of the type described in U.S. Pat. No. 3,455,883.

It is also possible to use the isocyanate-group-containing distillation residues accumulating in the production of isocyanates on a commercial scale, optionally in solution in one or more of the aforementioned polyisocyanates. It is also possible to use mixtures of the aforementioned polyisocyanates.

In general, it is particularly preferred to use readily available polyisocyanates, such as 2,4- and 2,6-tolylene diisocyanates and mixtures of these isomers ("TDI"); polyphenyl polymethylene polyisocyanates of the type obtained by condensing aniline with formaldehyde, followed by phosgenation ("crude MDI"); and, polyisocyanates containing carbodiimide groups, urethane groups, allophanate groups, isocyanurate groups, urea groups or biuret groups ("modified polyisocyanates").

The process according to the invention also enables isocyanates and amines, hydrazines or hydrazides with a functionality of more than two to be proportionately or exclusively used. It is surprising that the reaction of compounds of such relatively high functionality in hydroxyl group-containing materials does not result in the formation of solid, or at the least, very highly viscous reaction products. Rather the reaction results once again in the formation of finely divided, low-viscosity dispersions.

The polyaddition products obtained by the process according to the invention, dispersed in the hydroxyl group-containing material, may also be modified by the proportionate use of monofunctional isocyanates, amines, hydrazine derivatives or ammonia. For example, the average molecular weight of the polyaddition products may be adjusted by incorporating monofunctional compounds of this type. In cases where alkanolamines with primary or secondary amino groups are used, it is possible to synthesize polyureas and polyurea polyhydrazo-dicarbonamides containing free hydroxyl groups. It is also possible to introduce other groups, such as ester groups, relatively long aliphatic radicals, tertiary amino groups, and active double bonds, by utilizing correspondingly substituted monoamines or diamines and/or isocyanates.

According to the invention, the monofunctional compounds may generally be used in proportions of up to 40 mol % and more preferably in proportions of up to 25 mol % (based on total isocyanate, amine, hydrazine and hydrazide content).

Suitable monofunctional isocyanates include: alkyl isocyanates, such as methyl, ethyl, isopropyl, isobutyl, hexyl, lauryl and stearyl isocyanate; chlorohexyl isocyanate; cyclohexyl isocyanate; phenyl isocyanate; tolyl isocyanate, 4-chlorophenyl isocyanate, and diisopropyl phenyl isocyanate.

Examples of suitable monoamines include alkyl and dialkyl amines with $C_1$–$C_{18}$ alkyl groups; cycloaliphatic amines, such as cyclohexyl amine and homologues thereof; aniline and N-alkyl anilines; aniline derivatives substituted on the benzene nucleus; alkanolamines, such as ethanolamine, diethanolamine, propanolamine, dipropanolamine, butanolamine and dibutanolamine; diamines with one tertiary and one primary or secondary amino group, such as N,N-dimethyl ethylene diamine and N-methyl piperazine. Suitable monofunctional hydrazine derivatives and hydrazides include: N,N-dialkyl hydrazines, the hydrazides of monocarboxylic acids, hydrazine monocarboxylic acid esters of monofunctional alcohols or phenols, and semicarbazides, such as methyl, ethyl, propyl, butyl, hexyl, dodecyl, stearyl, phenyl and cyclohexyl semicarbazide.

As noted above, it is also possible to include in the active hydrogen containing material relatively low molecular weight glycols and polyols, having molecular weights up to 400. Suitable low molecular weight polyols are the diols and triols generally known from polyurethane chemistry as chain extenders and crosslinkers, such as 1,2- and 1,3-propylene glycol, 1,4- and 2,3-butylene glycol, 1,6-hexane diol, 1,8-octane diol, neopentyl glycol, cyclohexane dimethanol, 2-methyl-1,3-propane diol, glycerol, trimethylol propane, 1,2,6-hexane triol, 1,2,4-butane triol or trimethylol ethane, but glycols with hydrophilic character, such as ethylene glycol, diethylene glycol, triethylene glycol and dipropylene glycol are preferred. In addition, however, it is also possible to use compounds, such as dibutylene glycol, thiodiglycol and castor oil, in component (3). Ester diols corresponding to one of the following general formulae are also useful:

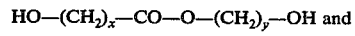
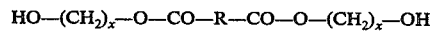

wherein
R represents an alkylene or arylene radical having from 1 to 10 carbon atoms and preferably having from 2 to 6 carbon atoms,
x = from 2 to 6 and
y = from 3 to 5. Specific examples include δ-hydroxy butyl-E-hydroxy caproic acid ester, ω-hydroxy hexyl-γ-hydroxy butyric acid ester, adipic acid-bis-(β-hydroxyethyl)-ester and terephthalic acid-bis-(β-hydroxy-ethyl)-ester. Diol urethanes corresponding to the following general formula are also useful:

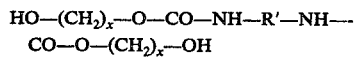

wherein
R' represents an alkylene, cycloalkylene or arylene radical having from 2 to 15 carbon atoms and preferably having from 2 to 6 carbon atoms, and
x is an integer of from 2 to 6. Examples include 1,6-hexamethylene-bis-(β-hydroxyethyl urethane) or 4,4'-diphenyl methane-bis-(δ-hydroxybutyl urethane). Even diol ureas corresponding to the following general formula are useful:

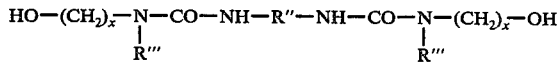

wherein

R″ represents an alkylene, cycloalkylene or arylene radical having from 2 to 15 carbon atoms and preferably having from 2 to 9 carbon atoms.

R‴ represents H or CH$_3$ and x = 2 or 3. Examples include 4,4′-diphenyl methane-bis-(β-hydroxyethyl urea) or the compound:

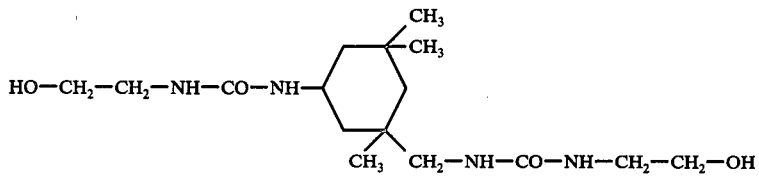

Particularly suitable low molecular weight dihydric and trihydric alcohols are those which, in admixture with the relatively high molecular weight polyethers, give a dispersant (component (3) in the process according to the present invention) which is liquid below 50° C. The viscosity of the reaction mixture in the throughflow mixers at the reaction temperature is generally below 2000 cP, preferably below 1000 cP and most preferably in the range of from 100 to 500 cP.

In general, component (3) contains at least 40%, by weight, and preferably at least 70%, by weight, of the hydroxyl-containing material having a molecular weight of more than 500.

The use of inert organic solvents is also possible with component (3). Preferred inert organic solvents are those with a boiling point of from 80 to 200° C and which may be removed from the dispersant by evaporation on completion of the polyaddition reaction. It is particularly preferred to use optionally halogenated hydrocarbons, such as benzene or toluene. Providing the reaction mixture is effectively cooled in the throughflow mixer, or, in the case of formulations having a relatively low solids content in the dispersions formed, where little heat of reaction is liberated, it is, of course, also possible to use lower-boiling inert organic solvents (for example acetone). It is preferred to use approximately 10 to 50%, by weight, of the organic solvent (based on the reaction mixture as a whole).

The molecular weight of the polyaddition products formed in dispersion in hydroxyl containing material is determined by the quantitative ratio between the polyamine, hydrazine or hydrazide on the one hand and the polyisocyanate on the other hand (and by the monofunctional compounds used, if any). It is particularly preferred to react substantially equivalent quantities of isocyanates and NH-functional compounds in the hydroxyl group-containing material. However, it is also possible to use a small excess of isocyanate (approximately 5%), although in this case products of higher viscosity are obtained because the excess of polyisocyanate reacts with the hydroxyl functional material. In the case of the amine, hydrazine or hydrazide, it is possible to use a larger excess, in which case polyaddition products with reactive terminal groups and a limited molecular weight are obtained. In general, an NCO:NH ratio of from 0.80 to 1.05, more preferably from 0.90 to 1.02, is maintained.

The concentration of the polyaddition products in the hydroxyl group-containing material may vary within wide limits, although it is generally from 1 to 35% by weight, more preferably from 3 to 30% by weight. The quantity of dispersed polyaddition product required for foams with optimal properties is generally about 10% by weight. It is readily possible in accordance with the instant invention to produce 10% by weight dispersions, of this type. For economic reasons, however, it is preferred to prepare a dispersion with as large a content of polyaddition products as possible (in general from 20 to 30% by weight) and to then dilute this dispersion with a hydroxyl group containing material to the required concentration. This highly economic procedure represents yet another advantage of the process according to the invention over the process described in German Auslegeschrift No. 1,260,142.

In general, the reaction components are introduced into a flow mixer of the type generally known in the art at room temperature. The reaction temperatures may rise to from 50 to 150° C under the effect of the shear forces generated in cases where a dynamic mixer is used and under the effect of the heat of the polyaddition reaction generated depending upon the quantity of resinous solids. In general, however, it is best to keep the temperature below 110° C (optionally by cooling the mixer), because otherwise any water which may be present evaporates and can give rise to disturbances as a result of bubble formation. In cases where hydrazine is used, it is important to ensure that the decomposition temperature of hydrazine is not exceeded.

An important feature of this process is that the polyaddition reaction of polyisocyanates and polyamines, hydrazines or hydrazides is carried out in high-performance continuous flow mixers with average residence times of from about 1 second up to 10 minutes and preferably from 2 seconds to 3 minutes.

The homogenization or dispersion time θ, should only amount to at most 10% of the average residence time, τ̄, in order to obtain thorough admixture of the components. According to the invention, it is possible, although not essential, to arrange two or even more flow mixers one behind the other. The times quoted above then apply logically to the mixer system as a whole.

Flow mixers are known and divided into two groups, namely static mixers with fixed fittings, and dynamic mixers with movable fittings operating on the rotor-stator principle. They may optionally be heated or cooled. In the case of static mixers, the mixing energy required is applied through pumps, whereas in the case of dynamic mixers a separate motor drives the rotor.

In every case, the dispersing effect and, hence, the particle size in the dispersion is governed by the energy applied and the shear forces correspondingly generated.

Static mixers may be divided into the following groups:
(a) Mixers with simple fittings. (see e.g. U.S. Pat. No. 3,286,992, German Offenlegungsschrift No. 2,119,239 and U.S. Pat. No. 3,704,006).
(b) Multi-channel mixers (for example, the AMK-Ross-ISG Mixers manufactured by Aachener Misch-und Knetmaschinen-Fabrik, West Germany).
(c) So-called packing mixers, for example, the static mixers manufactured by Sulzer AG (Winterthur, Switzerland) and the BKM-Mixers manufactured by Bayer AG (West Germany). (See, e.g. U.S. Pat. No. 3,785,620 and German Offenlegungsschrift No. 2,328,795 corresponding to U.S. Ser. No. 474,836, respectively).

(d) Further variants of static mixers are mixing nozzles, for example, those manufactured by the Lechler Company (Stuttgard, West Germany) or the mixing chambers in the HK-machines manufactured by the Hennecke Company (Birlinghofen, West Germany) into which the starting products are injected under high pressure (counter-current injection).

Dynamic mixers suitable for use in the process according to the invention include the flow mixers manufactured by the companies Ekato RMT (Schopfheim, West Germany), Lightnin (Neu-Isenburg, West Germany) and Hennecke (toothed stirrer) which, like the known impeller-type homogenizing machines operate on the stator-rotor principle, but cannot be used to perform feed or delivery functions. The energy required for dispersion in general amounts to from 1 to more than 10 kW per liter of mixer volume, depending upon the required particle size, the type of mixer used and the viscosity of the starting materials.

In cases where anhydrous amines, hydrazines and hydrazides are used, there is no need for any further working-up on completion of the polyaddition reaction. However, in cases where aqueous amines (for example, aqueous ethylene diamine solution or hydrazine hydrate) are used, it is advisable in some cases to remove the water from the dispersion in vacuo.

In general, the process according to the invention is carried out by introducing the three components hydroxyl-group containing material, NH-component and polyisocyanate) from separate supply vessels through metering pumps into the flow mixer in which they are thoroughly mixed and in which, at the same time, most of the polyaddition reaction takes place. However, it is also possible to combine the amine component with the hydroxyl-group containing component before introduction into the flow mixer. The substantially reacted product is then introduced into a receiver in which it is optionally stirred to complete the reaction, optionally with heating to form 50° to 150° C. In cases where aqueous amines are used, the end products are, if desired, freed in vacuo from the water present in them.

Additives, such as activators, stabilizers, water, blowing agents, flameproofing agents and pigment pastes, may be added to the dispersions prepared by the process according to the invention either during or after the reaction.

The dispersions prepared by the process according to the invention may be processed, for example, into soft, semi-hard and hard polyurethane foams with improved properties, such as increased tensile strength and hardness. In addition, foams of the polyhydrazodicarbonamide dispersions are distinguished by increased whiteness. The dispersions are also suitable for the production of, for example, elastomers, coverings and coatings based on polyurethanes.

The process according to the invention is illustrated by the following Examples. Unless otherwise indicated, parts are parts by weight and percentages percent by weight.

The abbreviations used in the Examples for the polyethers have the following meanings:

Polyether (A): A trimethylol propane-started polyether of propylene oxide and ethylene oxide with an OH number of 34 and a primary OH-group content of approximately 80% based on the total OH content of the polyether.

Polyether (B): Same as Polyether (A), but with an OH number of 35 and a primary OH-group content of approximately 70% based on the total OH content of the polyether.

Polyether (C): A glycerol-started polyether of propylene oxide and ethylene oxide with an OH number of 56 and a primary OH-group content of approximately 50% based on the total OH content of the polyether.

Polyether (D): Same as Polyether (A), but with an OH number of 28 and a primary OH-group content of approximately 80% based on the total OH content of the polyether.

Polyether (E): A trimethylol propane-started polyether of propylene oxide and ethylene oxide with an OH number of 49 and containing essentially only secondary OH groups.

Polyether (F): A linear polypropylene glycol (OH number 56).

Polyether (G): A linear polypropylene glycol terminally modified with ethylene oxide (OH number 28; approximately 80% by weight of the OH groups are primary OH-groups).

Polyether (H): A trimethylol propane-started polyethylene oxide (OH number 550).

EXAMPLE 1

800 g/minute of Polyether (D), 169 g/minute of a mixture of 80% of 2,4- and 20% of 2,6-tolylene diisocyanate and 49 g/minute of hydrazine hydrate are continuously introduced at room temperature into two toothed stirrers arranged one behind the other (chamber volumes 1.5 liter and 0.5 liter, respectively; rotational speed 1500 rpm). The three components are directly introduced separately from one another into the mixing zone of the first toothed stirrer. The polyether is delivered from the supply vessel through a gear pump, while the two thinly liquid components are introduced from separate supply vessels through piston-type metering pumps. The highly exothermic polyaddition reaction takes place in the toothed stirrers. The reaction temperature is adjusted to from 100° to 150° C by cooling the toothed stirrers. After a residence time of approximately 2 minutes, an almost completely reacted white dispersion leaves the second toothed stirrer. The dispersion is transferred to a dwell vessel where it is stirred at from 80° to 100° C. After stirring, the water emanating from the hydrazine hydrate is distilled off in vacuo at 100° C. A stable, white, finely divided dispersion having a solids content of 20%, with an OH number of 22.5, a viscosity of 3700 cP/25° C and a pH-value of 8.3 is obtained.

After dilution with Polyether (D) to a polyhydrazodicarbonamide content of 10% by weight the viscosity amounts to 1900 cP/25° C (OH number: 25.2).

Comparison Example 1a (According to German Auslegeschrift No. 1,260,142)

Following the addition of 1.225 kg of hydrazine hydrate, 4.225 kg of a mixture of 80% of 2,4- and 20% of 2,6-tolylene diisocyanate are run with intensive stirring over a period of 30 minutes at room temperature into 45 kg of Polyether (D). The temperature rises to 55° C, accompanied by precipitation of the polyhydrazodicarbonamide. After stirring for 1 hour, the water emanating from the hydrazine hydrate is removed in vacuo at 100° C. A white dispersion having a solids content of 10%, with an OH number of 25.2, a viscosity of 19,000 cP/25° C and a pH-value of 8.3 is obtained.

EXAMPLE 2

The procedure is as in Example 1. 800 g/minute of Polyether (A), 169 g/minute of a mixture of 80% of 2,4- and 20% of 2,6-tolylene diisocyanate and 49 g/minute of hydrazine hydrate are continuously introduced into the first toothed stirrer. The total residence time amounts to about 2 minutes.

A stable, white, finely divided dispersion having a solids content of 20%, with an OH number of 27, a viscosity of 3300 cP/25° C and a pH-value of 8.2, is obtained following removal of the water by distillation.

After dilution with Polyether (A) to a solids content of 10%, the viscosity amounts to 1600 cP/25° C (OH number 30.5).

Comparison Example 2a (According to German Auslegeschrift No. 1,260,142)

The procedure is the same as in Comparison Example 1a. 45 kg of Polyether (A) and 1.225 kg of hydrazine hydrate are initially introduced, and 4.225 kg of a mixture of 80% of 2,4- and 20% of 2,6-tolylene diisocyanate are added thereto over a period of 30 minutes. A dispersion having a 10% solids content, with an OH number of 30.5, a viscosity of 17,500 cP/25° C and a pH-value of 8.2, is obtained after stirring for 1 hour and removal of the water by evaporation.

EXAMPLE 3

The procedure is as in Example 1, except that 1600 g/minute of Polyether (B), 338 g/minute of a mixture of 80% of 2,4- and 20% of 2,6-tolylene diisocyanate and 98 g/minute of hydrazine hydrate are introduced into the toothed stirrer. The total residence time in the stirrers amounts to approximately 1 minute.

A stable, white, finely divided dispersion having a solids content of 20%, an OH number of 28, a viscosity of 2900 cP/25° C and a pH-value of 8.1, is obtained following removal of the water by distillation.

After dilution with Polyether (B) to a solids content of 10%, the viscosity amounts to 1500 cP/25° C (OH number: 31.5).

EXAMPLE 4

The procedure is as in Example 1, except that 800 g/minute of Polyether (C), 169 g/minute of a mixture of 80% of 2,4- and 20% of 2,6-tolylene diisocyanate and 49 g/minute of hydrazine hydrate, are introduced into the two toothed stirrers. In this Example, however, the total volume of the two stirrers was only 100 ml and the residence time about 6 seconds. The temperature of the dispersion issuing from the mixer is maintained at approximately 60° C by cooling the toothed stirrers.

A stable, white, finely divided dispersion having a solids content of 20%, with an OH number of 45, a viscosity of 1400 cP/25° C and a pH-value of 7.8, is obtained after working-up.

EXAMPLE 5

The procedure is as in Example 1, except that 800 g/minute of Polyether (A), 148.8 g/minute of the mixture of Example 4 of 2,4- and 2,6-tolylene diisocyanate and 67.4 g/minute of a 76% aqueous ethylene diamine solution are introduced into the two toothed stirrers. The total residence time amounts to about 2 minutes.

Removal of the water by distillation leaves a stable, white, finely divided dispersion (solids content = 20%) with an OH number of 27, a viscosity of 4600 cP/25° C and a pH-value of 10.1.

After dilution with Polyether (A) to a solids content of 10%, the viscosity amounts to 1730 cP/25° C.

EXAMPLE 6

Dispersions with different polyhydrazodicarbonamide contents are prepared in a standard foaming machine (UFS-machine, a product of the Hennecke Company) with a maximum polyether input of 12 kg. The three starting components are introduced into the mixing chamber of a stirrer (chamber volume 159 ml, toothed stirrer: 3500 rpm) through injection nozzles by means of reciprocating pumps. After an average residence time of approximately 2 seconds in the mixing chamber of the stirrer, the dispersion is stirred for 30 minutes at 80° C in a dwell vessel and subsequently freed from water in vacuo.

(a) 5700 g/minute of Polyether (A), 253.5 g/minute of a mixture of 80% of 2,4- and 20% of 2,6-tolylene diisocyanate and 73.5 g/minute of hydrazine hydrate are introduced into the mixing chamber by means of the three reciprocating pumps. A finely divided dispersion (solids content = 5%) with an OH number of 32, a viscosity of 1600 cP/25° C and a pH-value of 7.7, is obtained after stirring and removal of the water by distillation.

(b) 5400 g/minute of Polyether (A), 507 g/minute of the tolylene diisocyanate mixture and 147 g/minute of hydrazine hydrate, are introduced into the mixing chamber by the pumps. Working-up in the same way as in (a) gives a finely divided dispersion (solids content = 10%) with an OH number of 30.5, a viscosity of 1900 cP/25° C and a pH-value of 8.0.

(c) 5100 g/minute of Polyether (A), 760.5 g/minute of the tolylene diisocyanate mixture and 220.5 g/minute of hydrazine hydrate are introduced into the mixing chamber. Working-up in the same way as in (a) gives a finely divided dispersion (solids content = 15%) with an OH number of 29, a viscosity of 2450 cP/25° C and a pH-value of 8.1.

(d) 4800 g/minute of Polyether (A), 1014 g/minute of the tolylene diisocyanate mixture and 294 g/minute of hydrazine hydrate are introduced into the mixing chamber. Working-up in the same way as in (a) gives a finely divided, dispersion (solids content = 20%) with an OH number of 27, a viscosity of 3600 cP/25° C and a pH-value of 8.1.

EXAMPLE 7

400 g/minute of Polyether (G) and 49 g/minute of hydrazine hydrate are synchronously introduced at room temperature into a static mixer according to U.S. Pat. No. 3,286,992 (diameter: 6.3 mm, length: 290 mm, number of elements: 24) for emulsification through two of the heads of a four-head reciprocating pump. While 400 g/minute of Polyether (G) and 169 g/minute of a mixture of 80% by weight, of 2,4- and 20% by weight, of 2,6-tolylene diisocyanate are synchronously pumped by the other two heads through a second, identical static mixer. The mixtures leaving the two static mixers are then thoroughly mixed in a third static mixer (diameter: 6.3 mm, length: 152 mm, number of elements: 12). Part of the polyaddition reaction actually takes place in this static mixer, the mixture undergoing an increase in temperature to from 60° to 80° C. The dispersion flows from the mixer into a dwell vessel, in which it is stirred for 30 minutes at from 80° to 100° C to complete the reaction. The dispersion is then freed from water in vacuo.

A stable, white, finely divided dispersion (solids content = 20%) with an OH number of 22.5, a viscosity of 2470 cP/25° C and a pH-value of 8.1 is obtained. After dilution with Polyether (G) to a filler content of 10% by weight, the viscosity amounts to 1250 cP/25° C.

EXAMPLE 8

A mixture of 4000 g/minute of Polyether (H) and 245 g/minute of hydrazine hydrate, which has been mixed in a preceding toothed stirrer (chamber volume 0.5 liter), and 845 g/minute of a mixture of 80% of 2,4- and 20% of 2,6-tolylene diisocyanate, are continuously introduced at room temperature into a high-speed impeller-type homogenizer (volume 0.15 liter, rotational speed 3800 rpm). Both components directly enter the mixing zone of the homogenizer separately from one another. The mixture undergoes an increase in temperature both under the effect of the incipient polyaddition reaction and under the effect of the intense shear forces generated. The dispersion issuing from the homogenizer at a temperature of approximately 90° C is transferred to a dwell vessel in which it is stirred for 30 minutes at from 80° to 100° C. Removal of the water by distillation leaves a white, stable, finely divided dispersion (solids content = 20%) with an OH number of 495, a viscosity of 3200 cP/25° C and a pH-value of 8.1. After dilution with Polyether (H) to a solids content of 10%, the viscosity amounts to 1450 cP/25° C.

EXAMPLE 9

The procedure is as in Example 1, except that an excess of hydrazine is used and that the entire quantity of hydrazine hydrate is additionally emulsified beforehand in the polyether.

An emulsion of 800 g/minute of Polyether (A) and 53.7 g/minute of hydrazine hydrate and 166 g/minute of a mixture of 80% of 2,4- and 20% of 2,6-tolylene diisocyanate, are introduced into the two toothed stirrers.

Removal of the water by distillation leaves a stable, white, finely divided dispersion (solids content = 20%) with a viscosity of 2880 cP/25° C and a pH-value of 8.2. After dilution with Polyether (A) to a solids content of 10%, the viscosity amounts to 1450 cP/25° C.

EXAMPLE 10

The procedure is as in Example 7. 400 g/minute of Polyether (C) and 57 g/minute of diethylene triamine are premixed in one static mixer, while 400 g/minute of Polyether (C) and 143 g/minute of a mixture of 80% of 2,4- and 20% of 2,6-tolylene diisocyanate are mixed in the other static mixer. Both streams then enter the third mixer for reaction. A stable, white, finely divided dispersion (solids content = 20%) with an OH number of 45, a viscosity of 3250 cP/25° C and a pH-value of 10, is obtained after stirring.

After dilution with Polyether (C) to a solids content of 10%, the viscosity amounts of 1300 cP/25° C

EXAMPLE 11

The procedure is as in Example 1. 800 g/minute of Polyether (A), 45.3 g/minute of hydrazine hydrate and 171 g minute of a mixture of 80% of the above tolylene diisocyanate mixture and 20% of a polyphenyl-polymethylene-polyisocyanate, obtained by phosgenating an aniline-formaldehyde condensate with an approximately 50% binuclear content, are introduced into the two toothed stirrers.

A stable, finely divided dispersion (solids content = 20%) with an OH number of 27, a viscosity of 2900 cP/25° C and a pH-value of 7.5, is obtained.

After dilution to a solids content of 10% with Polyether (A), the viscosity amounts to 1450 cP/25° C.

EXAMPLE 12

The procedure is as in Example 7. 400 g/minute of Polyether (A) and 53.5 g/minute of an amine mixture of hydrazine hydrate and ethanolamine (molar ratio 9:2; calculated molecular weight of the dispersed particles: 2150) are mixed in the first static mixer, while 400 g/minute of Polyether (A) and 162 g/minute of the above tolylene diisocyanate mixture are mixed in the other static mixer. Both streams enter the third mixer for reaction. Removal of the water by distillation leaves a stable, white, finely divided dispersion (solids content = 20%) with an OH number of 37.6, a viscosity of 2850 cP/25° C and a pH-value of 9.5.

After dilution with Polyether (A) to a solids content of 10% by weight the viscosity amounts to 1500 cP/25° C.

EXAMPLE 13

The procedure is as in Example 1, except that the amine is previously dissolved in the polyether.

A solution of 97.7 g/minute of an aniline/formaldehyde condensate, consisting of 70% by weight of 4,4'-diamino diphenyl methane and 30% by weight of higher condensates, in 800 g of Polyether (E), and a mixture of 79.8 g/minute of the above tolylene diisocyanate with 22.5 g/minute of an allophanate (11.5% NCO) of 6 mols of tolylene diisocyanate and 1 mol of a polypropylene oxide with a terminal OH group (molecular weight: 2600), are introduced into the two toothed stirrers.

A stable, finely divided dispersion with an OH number of 39, a viscosity of 3500 cP/25° C and a pH-value of 7.5 is obtained.

After dilution with Polyether (E) to a solids content of 10% by weight the viscosity amounts to 1450 cP/25° C.

EXAMPLE 14

The procedure is as in Example 1, except that the amine is previously dissolved in the polyether.

A solution of 61.5 g/minute of hexamethylene diamine and 20 g/minute of the reaction product of hydrazine and the chlorocarbonic acid ester of a monofunctional polypropylene oxide (molecular weight: 2000) in 800 g/minute of Polyether (F), and 117.5 g/minute of 1-isocyanato-3,3,5-trimethyl-5-isocyanatomethyl cyclohexane, are introduced into the two toothed stirrers.

A stable, white, finely divided dispersion (solids content = 20%) with an OH number of 45, a viscosity of 2400 cP/25° C and a pH-value of 10 is obtained.

After dilution with Polyether (F) to a solids content of 10% by weight the viscosity amounts to 1200 cP/25° C.

EXAMPLE 15

The procedure is as in Example 7. 350 g/minute of Polyether (F), 66 g/minute of hydrazine hydrate and 30 g/minute of a linear polypropylene oxide with a terminal $NH_2$— group and a secondary OH-group (molecular weight: 2000) are mixed in the first static mixer, while 350 g/minute of Polyether (F) and 228 g/minute of the above tolylene diisocyanate mixture are mixed in the other static mixer. The two mixtures then enter the third mixer for reaction. A stable, white, finely divided dispersion (solids content = 30%) with an OH number of 39, a viscosity of 2900 cP/25° C and a pH-value of 8.1, is obtained after stirring and removal of the water by distillation.

After dilution with Polyether (F) to a solids content of 10% by weight the viscosity amounts to 900 cP/25° C.

EXAMPLE 16

The procedure is the same as in Example 1 except that a mixture (ratio, by weight 1:1) of Polyether (A) and dipropylene glycol is used.

A mixture of 400 g/minute of Polyether (A) and 400 g/minute of dipropylene glycol, 169 g/minute of a mixture of 80% of 2,4- and 20% of 2,6-tolylene diisocyanate and 49 g/minute of hydrazine hydrate are continuously introduced into the two toothed stirrers arranged one behind the other.

Working-up gives a stable, white, finely divided 20%, by weight, dispersion having an OH-number of 349 and a viscosity of 2100 cP at 25° C.

EXAMPLE 17

The procedure is the same as in Example 16. A mixture of 600 g/minute of Polyether (G) and 200 g/minute of 1,2-propylene glycol, 169 g/minute of tolylene diisocyanate (80% of 2,4- and 20% of 2,6-isomer) and 49 g/minute of hydrazine hydrate are continuously introduced into the two toothed stirrers.

Working-up gives a stable, white, finely divided 20%, by weight, dispersion having an OH-number of 312 and a viscosity of 1900 cP/25° C.

EXAMPLE 18

The procedure is as in Example 16. A mixture of 600 g/minute of Polyether (G) and 200 g/minute of ethylene glycol, 169 g/minute of tolylene diisocyanate (80% of 2,4- and 20% of 2,6-isomer) and 49 g/minute of hydrazine hydrate are continuously introduced into the two toothed stirrers.

Working-up gives a stable, white, finely divided 20%, by weight, dispersion having an OH-number of 378 and a viscosity of 1750 cP/25° C.

EXAMPLE 19

The procedure is the same as in Example 16. A mixture of 600 g/minute of Polyether (G), 200 g/minute of 1,4-butane diol, 169 g/minute of tolylene diisocyanate (80% of 2,4- and 20% of 2,6-isomer) and 49 g/minute of hydrazine hydrate are continuously introduced into the two toothed stirrers.

Working-up gives a stable, white, finely divided 20%, by weight, dispersion having an OH—number of 266 and a viscosity of 2400 cP/25° C.

EXAMPLE 20

1200 g/minute of an 80%, by weight, toluene solution of a slightly branched polyester (OH—number 699; $\eta$ = 22,000 cP/25° C; 1000 cP/75° C) based on adipic acid, diethylene glycol and trimethylol propane and 36.75 g/minute of hydrazine hydrate are synchronously delivered for emulsification at room temperature to a BKM-mixer (diameter: 14 mm, 8 mixer packs) through two pump heads of a piston pump having four heads. 487.5 g of the 80%, by weight, toluene solution of the above polyester and 126.75 g of a mixture of 80%, by weight, of 2,4- and 20%, by weight, of 2,6-tolylene diisocyanate are pumped through a Static Mixer ® (diameter: 6.3 mm, length: 290 mm, number of elements: 24) through the other two heads of the piston pump. The two component streams then enter a 500 ml capacity toothed stirrer in which the exothermic polyaddition reaction takes place. The reaction temperature is maintained at from 100° to 110° C by cooling the toothed stirrer. After a residence time of approximately 20 seconds, the almost completely reacted white dispersion leaves the toothed stirrer and enters a dwell vessel where it is stirred for approximately 30 minutes at from 80° to 100° C. After stirring the water emanating from the hydrazine hydrate and the toluene are distilled off in vacuo at from 100° to 110° C.

A stable, white, finely divided 10%, by weight, dispersion having an OH—number of 54.8 and a viscosity of 35,500 cP at 25° C is obtained.

EXAMPLE 21

1800 g/minute of the polyester mentioned in Example 20, 169 g/minute of a mixture of 80%, by weight, of 2,4- and 20%, by weight, of 2,6-tolylene diisocyanate and 49 g/minute of hydrazine hydrate are continuously introduced into a toothed stirrer (chamber volume 0.5 liter; rotational speed 2800 rpm). The three components flow directly into the mixing zone of the toothed stirrer separately from one another. The polyester heated to 60° C is delivered from the reservoir by means of a gear pump, while the two thinly liquid components are delivered at room temperature from separate reservoirs by means of piston metering pumps. The exothermic polyaddition reaction takes place in the toothed stirrer. The temperature is maintained at from 100° to 120° C by cooling. After a residence time of approximately 15 seconds, the almost completely reacted white dispersion leaves the toothed stirrer. The dispersion is transferred to a dwell vessel where it is stirred for about 30 minutes at from 80° to 100° C. After stirring, the water emanating from the hydrazine hydrate is removed in vacuo at from 100° to 110° C.

A stable, white finely divided 10%, by weight, dispersion having an OH—number of 54.8 and a viscosity of 34,600 cP/25° C is obtained.

EXAMPLE 22

The procedure and formulation are the same as in Example 21, except that a linear polyester based on adipic acid and 1,4-butane diol having an OH—number of 93.4 (waxlike at room temperature, viscosity: 260 cP/75° C) is used.

After the water has been distilled off, a stable, white finely divided 10%, by weight, dispersion having an OH—number of 84 (viscosity: 560 cP/75° C) which is wax-like at room temperature is obtained for a throughput of 2 kg of product per minute through the toothed stirrer.

EXAMPLE 23

The general procedure is the same as in Example 21. 1800 g/minute of Polyether (A), 103 g/minute of adipic acid dihydrazide (dissolved in 500 g of water) and 97 g/minute of hexamethylene diisocyanate are continuously introduced into the toothed stirrer.

After removing the water, a stable, while, finely divided 10%, by weight, dispersion having an OH—number of 266 and a viscosity of 1550 cP/25° C is obtained.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as it may be limited by the claims.

What is claimed is:

1. A process for the in situ production of stable dispersions of polyureas and/or polyhydrazodicarbonamides in a hydroxyl group containing material selected from the group consisting of polyethers, polyesters, polyester amides, polycarbonates and mixtures thereof, by reacting:
   (1) organic polyisocyanates, with
   (2) polyamines containing primary and/or secondary amino groups and/or hydrazines and/or hydrazides, in
   (3) said hydroxyl group containing material; wherein components (1), (2) and (3) are continuously introduced into a flow mixer in such a quantity that the average residence time in the mixer is less than 10 minutes, the equivalent ratio between components (1) and (2) being from 0.8:1 to 1.05:1, and the reaction product issuing from the flow mixer is subsequently collected in a receiver, said stable dispersions having a solids content of from 1 to 35% by weight.

2. A process as claimed in claim 1 wherein components (1), (2) and (3) are separately introduced into the flow mixer.

3. A process as claimed in claim 1, wherein component (1) is introduced separately from a mixture of components (2) and (3).

4. A process as claimed in claim 1, wherein the receiver is maintained at temperatures of from 50° to 150° C, and wherein the components are stirred therein.

5. A process as claimed in claim 1, wherein said hydroxyl group containing material is a polyether with at least two hydroxyl groups and a molecular weight of from 200 to 16,000.

6. A process as claimed in claim 1, wherein said hydroxyl group containing material is selected from the group consisting of polyesters, polyester amides, and polycarbonates having molecular weights of from 400 to 16,000.

7. A process as claimed in claim 1, wherein said hydroxyl group containing material has a molecular weight of from 500 to 12,000.

8. A process as claimed in claim 7, wherein component (3) contains an effective amount of polyols having molecular weights up to 400.

9. A process as claimed in claim 1, wherein component (3) contains an inert organic solvent.

10. A process as claimed in claim 9, wherein said solvent is removed from said dispersion upon completion of the reaction.

11. A process as claimed in claim 1, wherein linear polyethers containing one or two terminal amino, semicarbazide or isocyanate groups are used for stabilizing the dispersions formed.

12. Stable dispersions of polyureas and/or polyhydrazodicarbonamides in hydroxyl group containing materials selected from the group consisting of polyethers, polyesters, polyester amides, polycarbonates and mixtures thereof, obtained by reacting:
   (1) organic polyisocyanates, with
   (2) polyamines containing primary and/or secondary amino groups and/or hydrazines and/or hydrazides in
   (3) said hydroxyl group containing material, by continuously introducing components (1), (2) and (3) into a flow mixer in such a quantity that the average residence time in the mixer is less than 10 minutes, the equivalent ratio between components (1) and (2) being from 0.8:1 to 1.05:1, and subsequently collecting the reaction product issuing from the flow mixer in a receiver, said stable dispersions having a solids content of from a 1 to 35% by weight.

13. Stable dispersions produced as in claim 12 with the additional steps of storing and diluting said reaction product with hydroxyl containing material and/or storing and dehydrating said reaction product.

14. Dispersions as claimed in claim 12, wherein components (1), (2) and (3) are separately introduced into the flow mixer.

15. Dispersions as claimed in claim 12, wherein component (1) is introduced separately from a mixture of components (2) and (3).

16. Dispersions as claimed in claim 12, wherein the receiver is maintained at temperatures of from 50° to 150° C, and wherein the components are stirred therein.

17. Dispersions as claimed in claim 12, containing from 1 to 35% by weight, of polyureas and/or polyhydrazodicarbonamides.

18. Dispersions as claimed in claim 12, having a viscosity of less than 2500 cP/25° C at a solids content of approximately 10% by weight.

19. Dispersions as claimed in claim 12, wherein said hydroxyl group containing material is a polyether having a molecular weight of from 200 to 16,000.

20. The process of claim 1 wherein, in addition to components (1), (2) and (3), a compound selected from the group consisting of monofunctional organic isocyanates, monofunctional primary amines, monofunctional secondary amines and monofunctional hydrazine derivatives and monofunctional hydrazides are introduced into the flow mixer in a quantity of up to 40 mol%, based on components (1) and (2).

21. The process of claim 1 wherein, in addition to components (1), (2) and (3), an alkanolamine is introduced into the flow mixer in a quantity of up to 40 mol% based on components (1) and (2).

22. A process as claimed in claim 1 comprising the further steps of storing and diluting said reaction product with hydroxyl containing material and/or storing and dehydrating said reaction product.

* * * * *